March 7, 1967 E. F. DE HANN ET AL 3,307,983

METHOD OF MANUFACTURING A PHOTOSENSITIVE DEVICE

Filed March 10, 1964 2 Sheets-Sheet 1

INVENTORS
EDWARD F. DE HAAN

AGENT

March 7, 1967 E. F. DE HANN ETAL 3,307,983

METHOD OF MANUFACTURING A PHOTOSENSITIVE DEVICE

Filed March 10, 1964 2 Sheets-Sheet 2

INVENTORS
EDWARD F. DE HAAN
PAULUS PHM. SCHAMPERS
BY
Frank R. Jerifari
AGENT

United States Patent Office 3,307,983
Patented Mar. 7, 1967

3,307,983
METHOD OF MANUFACTURING A PHOTOSENSITIVE DEVICE

Edward Fokko De Haan and Paulus Philippus Maria Schampérs, both of Emmasingel, Eindhoven, Netherlands, assignors to North American Philips Company, Inc., New York, N.Y., a corporation of Delaware Filed Mar. 10, 1964, Ser. No. 350,872
Claims priority, application Netherlands, Mar. 12, 1963, 290,120
5 Claims. (Cl. 148—178)

Figure 1:
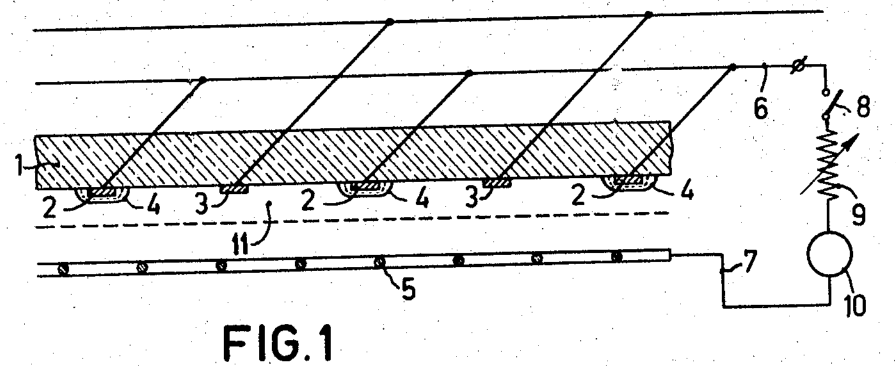

Our invention relates to a method of manufacturing a photosensitive device in which a layer constituted principally of lead monoxide (PbO) as a photosensitive material is applied to a support, and which layer has p-type conductivity at the area at which negative current is supplied to the layer. The invention also relates to a device manufactured by this method.

In a known method of this kind, used for the manufacture of a vidicon camera tube, the lead monoxide target plate, vapor-deposited on a signal electrode, is heated for a given period in an oxygen atmosphere. The purpose of this method is to produce in the target plate a zone comprising the free surface thereof and having p-type conducting lead monoxide, which zone joins a zone which is in contact with the signal electrode and which consists of n-type conductive lead monoxide obtained in a different manner. The planar p-n junction thus obtained was intended to maintain a low dark current. Apart from the disadvantage that it is difficult to obtain sufficiently reproduceable results, this method has a further disadvantage in that the target plate may be locally changed by the thermal treatment, which changes can result in a high local dark current. These local changes of the target plate become manifest in the form of white spots in the picture on the screen of a cathode-ray tube obtained by means of the electrical signals emanating from the camera tube.

We have found that in order to maintain a low value of the dark current, at least as far as the portion thereof is concerned, which is formed by the electrons supplied to the lead monoxide at the area of the negative current supply, if the lead monoxide at the area of the negative current supply is distinctly shifted towards p-type conductivity as compared with the material more remote from the area of negative current supply. Such p-conductivity type material need extend in the direction of the electric current through the photo-sensitive layer only over a comparatively very small distance.

In accordance with the invention, such a configuration can be obtained in a simple and reproducable, easily condition-matching manner. Consequently, the disadvantage of the creation of white spots in the picture on the screen of a cathode-ray tube from the electrical signals emanating from the camera tube is avoided.

Further in accordance with the invention, we have found that if the photo-sensitive material material at the area of negative current supply is exposed to oxygen bombardment, as a result of which additional oxygen is introduced into the material, this area is distinctly shifted towards p-type conductivity as compared with more remote areas. The bombardment with oxygen is preferably carried out by means of a gas discharge in an oxygen-containing atmosphere. This has the advantage of simple and accurate control, since the bombardment may be rapidly cut off at any instant.

In a further aspect of the invention, the surface of the lead monoxide layer remote from the support is subjected repeatedly to oxygen bombardment and intervening exposure to an atmosphere containing a gas of the group consisting of water vapor, sulphurated hydrogen, selenated hydrogen, tellurated hydrogen or a mixture of two or more of these gases. During this exposure the gas diffuses to such an extent into the surface of the photo-conducting layer that the oxygen introduced into said surface by the preceding bombardment is more or less compensated.

Figure 2:
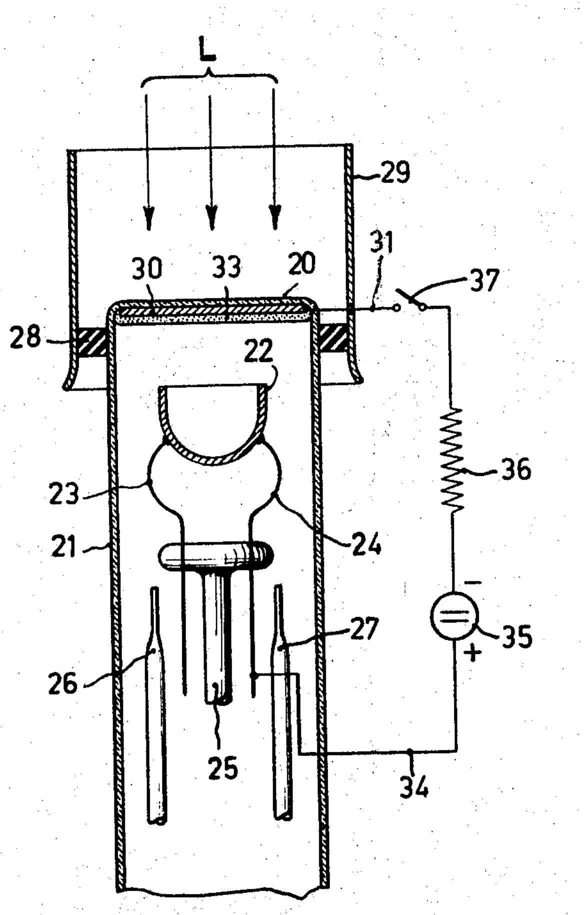
Figure 3:
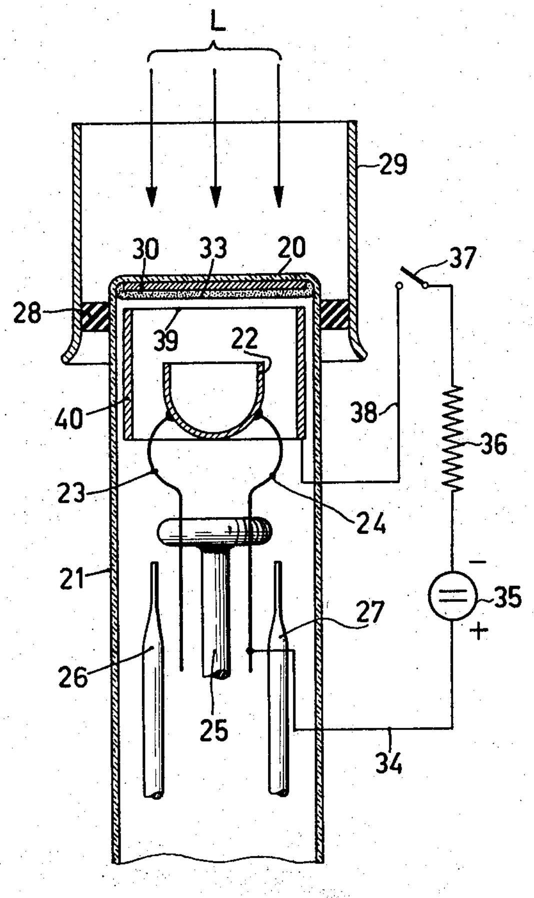

The invention will now be described with reference to the accompanying drawing in which FIG. 1 shows diagrammatically a stage of the manufacture of a photo-resistor cell comprising interdigital electrodes applied to a support;

FIG. 2 shows diagrammatically part of an arrangement used in the manufacture according to the invention of a vidicon-type camera tube; and FIG. 3 shows another device for carrying out the method according to the invention.

In both figures various dimensions, particularly the thicknesses of various elements are not shown in the correct ratio. However, dimensions used in actual practice are specified wherever necessary.

In the method illustrated in FIG. 1 for the manufacture of a photo-resistor cell alternating, parallel electrodes 2 and 3 are applied to an insulating support 1, part of the section of which is shown in FIG. 1. The support 1 of insulating material may be transparent and be made, for example of glass. The electrodes 2, which are electrically interconnected, may consist of conducting tin oxide or vapor-deposited silver and have a width of about 20$\mu$. The electrodes 3, which are also electrically interconnected, and have the same width as the electrodes 2, may consist of nickel or platinum vapor-deposited on the support 1. The distance between the centers of successive electrodes 2 and 3 is about 500$\mu$, and may, however, be larger, for example 1000$\mu$. Over each of the electrodes 2, and only over these electrodes, there is vapor-deposited, for example with the aid of a mask, a lead monoxide layer 4 having a thickness of a few microns, for example 2 to 3$\mu$. The lead monoxide for the formation of the layers 4 may be vapor-deposited in a gas atmosphere consisting of oxygen and an inert gas, for example argon. After the formation of the layers 4 they are exposed to an oxygen bombardment by means of a gas discharge in an oxygen atmosphere. The support 1 may, for this purpose form the cover of a vacuum vessel (not shown in FIG. 1) and be arranged so that at its side provided with the electrodes 2 and 3 and the layers 4 is turned towards the inside of the vessel. This vessel communicates with a vacuum pump and may receive oxygen the pressure of which can be controlled. Opposite support 1, at a distance of a few centimeters therefrom and inside the vessel, a metal grid 5 is arranged. The interconnected electrodes 2 and the grid 5 are connected by means of separate current supply conductors 6 and 7, to the outside of the vessel to a switch 8 in series with a variable resistor 9 and an electric supply source 10. After the vessel is exhausted and oxygen at a pressure of 4000 to $7000\times10^{-5}$ mm. Hg, for example about $5000\times10^{-5}$ mm. Hg is introduced, a gas discharge is produced between the grid 5 and the lead monoxide layers 4 by closing the switch 8. The source 10 may be either a direct-current or an alternating-current source, supplying a voltage of, for example about 1000 v. Resistor 9 is proportioned or adjusted so that the gas discharge between the grid 5 and the layers 4 yields a density of the electric current of, for example, 7 to 10$\mu$A./per square cm. of the surface of the layers 4. The gas discharge is maintained for a period varying between 10 and 60 seconds. For a smaller current density the period is longer. As a result of the gas discharge layers 4 being bombarded by oxygen ions, which are absorbed in said layers, the lead monoxide thereof becomes more or less distinctly p-type conducting. It is not objectionable to bombard these layers with oxygen with such intensity that as a result of the comparatively large quantity of additional oxygen absorbed in the layers 4 these layers have such a strong p-type conductivity that they may be considered to be good conductors. If the supply source 10 is a direct-current source, it is preferably connected so that the grid 5 is positive with respect to electrodes 2.

After the oxygen bombardment of the layers 4 a lead monoxide layer is vapor-deposited on the support 1 which layer extends over layers 4, electrodes 3 and the intermediate spaces. This layer, the surface of which is indicated in FIG. 1 by a full line and which is designated by 11, although it is not yet available in the stage illustrated in FIG. 1, is preferably vapor-deposited in such a way that the material thereof behaves as an intrinsic or substantially intrinsic conductor. The layer 11 may be vapor-deposited, for example in a gas atmosphere containing, apart from oxygen, a gas of the group consisting of water vapor, sulphurated, seleniated and tellurated hydrogen or mixtures thereof, for example in a gas atmosphere having an overall pressure of 1000 to $1200\times10^{-5}$ mm. Hg, the partial pressure of the gas of the said group being about one third thereof.

After the formation of the lead monoxide layer 11, which may have a thickness of for example 5 to $10\mu$, it is permanently protected from the open air by means of a hood or lid (not shown) to be disposed thereon. The rim of this hood or lid is connected with the surface of the support 1. If the support 1 is not transparent, the hood or the lid should be transparent. The space enclosed by the support 1 and the hood or lid, may be exhausted in order to exclude any detrimental effects of an enclosed atmosphere on the layer 11. It is also advantageous to provide in that space oxygen at a low pressure, for example about $100\times10^{-5}$ mm. Hg.

In the operation of the photo-resistor cell thus manufactured a circuit including an electrical voltage source and means for measuring electrical current through this circuit is connected between electrodes 2 and electrodes 3 in such manner that the electrodes 2 provide the negative current supply and the electrodes 3 provide the positive current supply to the lead monoxide. Owing to the distinctly p-type conductivity of the layers 4 as compared with the material of the layer 11 it is ensured that a dark current due to electrons injected by way of the electrodes 2 into the lead monoxide is kept low.

FIG. 2 shows diagrammatically part of an arrangement by means of which a layer of lead monoxide is vapor-deposited on a window 20 of a cylindrical bulb 21 forming the envelope of a vidicon-type camera tube. This window is provided with a signal electrode and the surface of the layer is subsequently exposed to oxygen bombardment in an oxygen atmosphere by a gas discharge.

Bulb 21 is disposed and connected to and with a duct (not shown) of a pump system. Inside the bulb, opposite the window 20, there is disposed an evaporation crucible 22, which is supported by two supporting wires 23 and 24, operating in common as a thermo-element, and secured in a glass support 25. Inside the bulb 21 two capillary tubes 26 and 27 terminate through which a gas, for example oxygen and a gaseous hydrogen compound, for example water vapor, sulphurated, seleniated, tellurated hydrogen or a mixture of two or more of these gases can be introduced in a uniform flow into the bulb 21. The upper side of the bulb 21 is surrounded by a sleeve 29, which is closed by means of a rubber ring 28, joining the bulb 21. This sleeve contains a liquid for holding the window 20 at a given temperature.

The inner side of the window 20 is provided with a transparent conducting signal electrode 30, which may consist of conducting tin oxide, to which a current supply conductor 31 leading to the outside of the bulb is connected. In the stage preceding the state shown in FIG. 2 high-frequency heating of the platinum crucible 22 has melted and evaporated a quantity of lead monoxide, so that the signal electrode 30 is provided with a layer of lead monoxide 33 of a thickness of, for example 10 to $20\mu$. During this vapor-deposition of layer 33 the window 20 may be held at a substantially constant temperature of about 100° C. by means of a suitable liquid, for example glycerine, in sleeve 29. The vapor-deposition of the lead monoxide from the crucible 22 onto the signal electrode 30 may be carried out in an atmosphere consisting of oxygen at a pressure of, for example 1 to $2\times10^{-5}$ mm. Hg and an inert gas, for example, argon.

After the vapor-deposition of the lead monoxide layer 33 the surface thereof is exposed to an oxygen ion bombardment. Oxygen ions are obtained by means of a gas discharge in an oxygen atmosphere inside the bulb 21. To this end the conductor 31, connected to the signal electrode 30, and a conductor 34 are connected to one or to both stay wires 23 and 24. This conductor normally extends through the wall of the duct thus deviating from what is shown in FIG. 2 for the sake of simplicity since the bulb 21 is connected to a vacuum pump. The conductors are connected to a voltage source 35 in series with a resistor 36 and a switch 37. The voltage source 35 is preferably a direct-current source supplying a voltage of, for example, about 1000 v. The positive terminal of this source is connected to the conductor 34. By closing the switch 37 a gas discharge is produced between the platinum crucible 22 and the lead monoxide layer 33 in the oxygen atmosphere filling the bulb 21 in this stage. This oxygen atmosphere may have a pressure of 4000 to $6000\times10^{-5}$ mm. Hg, for example about $5000\times10^{-5}$ mm. Hg. In order to render the layer 33 sufficiently conductive, it can be exposed to light from the outside (indicated in FIG. 2 by L). Resistor 36 is adjusted, or chosen, so that the overall current in the circuit including this resistor is about 60 $\mu$a. Thus with the diameter of the window 20 in the embodiment shown being about 3 cms. the resulting current density in the layer 33 is about 8 $\mu$a./per square cm. With the stated pressure of the oxygen atmosphere in the bulb 21 of about $5000\times10^{-5}$ mm. Hg, a voltage from source 35 of about 1000 v. and a distance between the upper side of the crucible 22 and the surface of the layer 33 of about 40 mm. and with adequate exposure of the layer 33 to light the resistance of resistor 36 of about 6M ohms is found to be suitable. The duration of the gas discharge, during which the surface of the layer 33 is bombarded by oxygen ions, which are thus absorbed in the said layer, may be about half a minute. It is not necessary for the window 20 to be held at a given temperature; the window may be at room temperature. After this first treatment by means of a gas discharge, the oxygen is removed from the bulb 21 and replaced by a sulphurated hydrogen atmosphere at a pressure of about $200\times10^{-5}$ mm. Hg. The previously bombarded lead monoxide layer 33 is now exposed to this for about 5 to 10 minutes during which the layer need not be exposed to light. The above-mentioned time applies to a temperature of the window 20 approximately equal to room temperature; with a higher temperature of the window the duration may be shorter.

After this exposure of the layer 33 to a sulphurated hydrogen atmosphere, the layer is subjected again, in the manner described above, to an oxygen-ion bombardment. It may be desirable to expose the layer afterwards again to a sulphurated hydrogen atmosphere and then subjected anew to an oxygen-ion bombardment. These two treatments may even be repeated several times in succession; the complete treatment of the layer is preferably always terminated by an oxygen-ion bombardment as described above.

The exposure of the layer 33 to a sulphurated hydrogen atmosphere, subsequent to a bombardment with oxygen-ions, serves to cause said gas to diffuse into the layer in order to obtain a higher sensitivity to red light. For a satisfactory operation of the camera tube it is quite desirable that the surface of the lead monoxide layer 33 consist of p-type conducting material, which, however, should not have a p-type conductivity such that transverse conductivity occurs. A variation in the electrical nature of the layer 33 due to the absorption of sulphurated hydrogen which has an n-forming effect, is neutralized by the subsequent oxygen-ion bombardment, whereby an additional quantity of oxygen is introduced into the layer. Oxygen operates as a p-former and thus compensates the effect of the absorbed sulphurated hydrogen on the electrical conductivity of the layer. Repeatedly subjecting the layer to an oxygen bombardment followed each time by an exposure of the layer 33 to an atmosphere containing sulphurated hydrogen atmosphere results in a greater quantity of sulphurated hydrogen being absorbed in the lead monoxide than could be obtained by a single exposure of the layer to a suphurated hydrogen containing atmosphere.

For the gas discharge in the oxygen atmosphere inside the bulb 21 it is not necessary that the lead monoxide layer 33 constitute one of the electrodes. Thus, the bulb 21 may be provided with a separate electrode opposite or around the platinum crucible 22, for example in the form of a metal cylinder 40, as shown in FIG. 3. In this case the switch 37 is connected to a conductor 38 leading to the cylinder 40. This conductor 38 passes through the wall of the duct with which the lower end of the bulb 21 is connected to vacuum pump 40. The cylinder 40 may be closed at the upper end by a gauze 39.

Instead of exposing layer 33 to a sulphurated hydrogen atmosphere each time between two oxygen-ion bombardments, the layer may be exposed to an atmosphere containing seleniated hydrogen, tellurated hydrogen or a mixture of two or more of these hydrogen compounds, if desired together with water vapor. Since seleniated hydrogen and tellurated hydrogen have a greater reactivity than sulphurated hydrogen and water vapor, the duration of the exposure or the pressure of the hydrogen compound should be less than when the first-mentioned gases are utilized.

By alternating exposures of the lead monoxide layer 33 to oxygen and to an atmosphere containing an n-forming gas, for example water vapor, sulphurated, seleniated or tellurated hydrogen or mixtures of two or more of these gases, the layer 33 may have, in the direction of thickness, a p-i-(n)-(i)-p-structure, which may be repeated, in which case the presence of the narrow regions (n) and (i) is facilitated and depends upon the extent to which the gaseous hydrogen compound absorbed by the lead monoxide layer is compensated by the additional quantity of oxygen therein resulting from the oxygen bombardment. With such a structure a low dark current and a satisfactory sensitivity, particularly to the long waves of the visible spectrum can be obtained.

The invention has been described in the foregoing with reference to embodiments in which an oxygen bombardment is performed with the aid of a gas discharge. Instead thereof, the same effect may also be obtained by bombarding the lead monoxide with oxygen atoms or molecules which have been given a high thermal velocity. To this end a heated body, for example an electrically-heated filament helix may be disposed in an oxygen atmosphere of a pressure of 4000 to $6000 \times 10^{-5}$ mm. Hg opposite the lead monoxide layer to be bombarded, for example at a distance comparable with the free path of the oxygen molecules in the oxygen atmosphere concerned. This heated body imparts to the oxygen molecules a high thermal velocity. It will be understood that the latter method can only be employed if any radiation from the heated body which may be received by the lead monoxide does not adversely affect said material. It may therefore be necessary to cool the support of the lead monoxide on the outer side, for example by means of a liquid or by a gas jet directed onto the support.

Therefore, while we have described the invention with reference to particular examples and applications thereof, other modifications will be apparent to those skilled in this art without departing from the spirit and scope of the invention as defined in the appended claims.

What we claim is:

1. A method of manufacturing a photosensitive device comprising the steps, applying to portions of a support a layer consisting essentially of lead monoxide, biasing selected areas of said layer of lead monoxide negatively to effect an electrical discharge through an atmosphere containing oxygen at a pressure of about 4000 to $6000 \times 10^{-5}$ mm. Hg to form oxygen ions which bombard said areas and introduce oxygen into the layer at said areas.

2. A method of claim 1 wherein said lead monoxide layer is vapor deposited.

3. A method of manufacturing a photosensitive device comprising the steps, applying to portions of a support a layer consisting essentially of lead monoxide, biasing selected areas of said layer of lead monoxide negatively to effect an electrical discharge through an atmosphere containing oxygen at a pressure of about 4000 to $6000 \times 10^{-5}$ mm. Hg while said layer is exposed to light to form oxygen ions which bombard said areas and introduce oxygen into the layer at said areas.

4. A method of manufacturing a photosensitive device comprising the steps, applying to portions of a support a layer consisting essentially of lead monoxide biasing selected areas negatively, to effect an electrical discharge through an atmosphere containing oxygen at a pressure of about 4000 to $6000 \times 10^{-5}$ mm. Hg whereby oxygen is introduced into said layer at said selected areas, subjecting the layer to the action of an atmosphere selected from the group consisting of sulphurated hydrogen, seleniated hydrogen, tellurated hydrogen, water vapor, and mixtures thereof, and repeating said step of effecting an electrical discharge in an atmosphere containing oxygen.

5. A method of manufacturing a photosensitive device comprising the steps, applying to portions of a support a layer consisting essentially of lead monoxide biasing selected areas negatively, to effect an electrical discharge through an atmosphere containing oxygen at a pressure of about 4000 to $6000 \times 10^{-5}$ mm. Hg to introduce oxygen into the layer at said selected areas, subjecting the layer to the action of an atmosphere selected from the group consisting of sulpurated hydrogen, seleniated hydrogen, tellurated hydrogen, water vapor, and mixtures thereof, and repeating said step of effecting an electrical discharge in an atmosphere containing oxygen.

References Cited by the Examiner

UNITED STATES PATENTS

| | | | |
|---|---|---|---|
| 3,035,205 | 5/1962 | Berghaus et al. | 204—164 |
| 3,174,882 | 3/1965 | Logan | 148—1.5 |

OTHER REFERENCES

Laws, J. Chem. Phys. 39 (8), pages 1924–1942, and 1963.

JOHN H. MACK, *Primary Examiner.*

R. K. MIHALEK, *Assistant Examiner.*